United States Patent
Yoo et al.

(10) Patent No.: US 11,198,435 B2
(45) Date of Patent: Dec. 14, 2021

(54) OPTIMUM HEADWAY DISTANCE SETTING SYSTEM AND OPTIMUM HEADWAY DISTANCE SETTING METHOD USING THE SAME

(71) Applicants: HYUNDAI MOTOR COMPANY, Seoul (KR); KIA MOTORS CORPORATION, Seoul (KR)

(72) Inventors: Seung-Jae Yoo, Hwaseong-si (KR); Ja-Chun Han, Hwaseong-si (KR); Chang-Yu Kim, Bucheon-si (KR); Soo-Lim Han, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 268 days.

(21) Appl. No.: 16/533,041

(22) Filed: Aug. 6, 2019

(65) Prior Publication Data
US 2020/0047756 A1 Feb. 13, 2020

(30) Foreign Application Priority Data
Aug. 9, 2018 (KR) .................. 10-2018-0093343

(51) Int. Cl.
| | |
|---|---|
| *B60W 30/16* | (2020.01) |
| *B60W 10/04* | (2006.01) |
| *B60W 10/18* | (2012.01) |
| *B60W 30/18* | (2012.01) |

(52) U.S. Cl.
CPC ............ *B60W 30/16* (2013.01); *B60W 10/04* (2013.01); *B60W 10/18* (2013.01); *B60W 30/18127* (2013.01); *B60W 2520/10* (2013.01); *B60W 2554/801* (2020.02); *B60W 2554/804* (2020.02); *B60W 2710/18* (2013.01); *B60W 2720/106* (2013.01)

(58) Field of Classification Search
CPC ..................................................... B60W 30/16
See application file for complete search history.

(56) References Cited

U.S. PATENT DOCUMENTS

| 6,769,504 B2 * | 8/2004 | Kobayashi | B60K 31/0008 180/169 |
|---|---|---|---|
| 7,576,838 B2 * | 8/2009 | Shirai | G01S 17/931 356/28 |
| 9,162,677 B2 * | 10/2015 | Sekine | B60W 30/143 |
| 2020/0047756 A1 * | 2/2020 | Yoo | B60W 50/0098 |
| 2020/0216069 A1 * | 7/2020 | Elflein | B60W 30/16 |

FOREIGN PATENT DOCUMENTS

KR    10-2013-0026934 A    3/2013

\* cited by examiner

*Primary Examiner* — Michael A Berns
(74) *Attorney, Agent, or Firm* — Morgan, Lewis & Bockius LLP

(57) ABSTRACT

The optimum headway distance setting method may include determining whether or not to stop the speed adjustment operation for a vehicle by a driver of the vehicle by a control unit in the state detecting a front vehicle 1F which is traveling in front of the vehicle; determining whether or not to be stabilization of a headway distance between the vehicle and the front vehicle by the control unit when the speed adjustment operation for the vehicle is stopped; setting the optimum headway distance configured to set the stabilized headway distance as an optimum headway distance according to a traveling propensity of the driver by the control unit, and stores the optimum headway distance in the control unit.

16 Claims, 4 Drawing Sheets

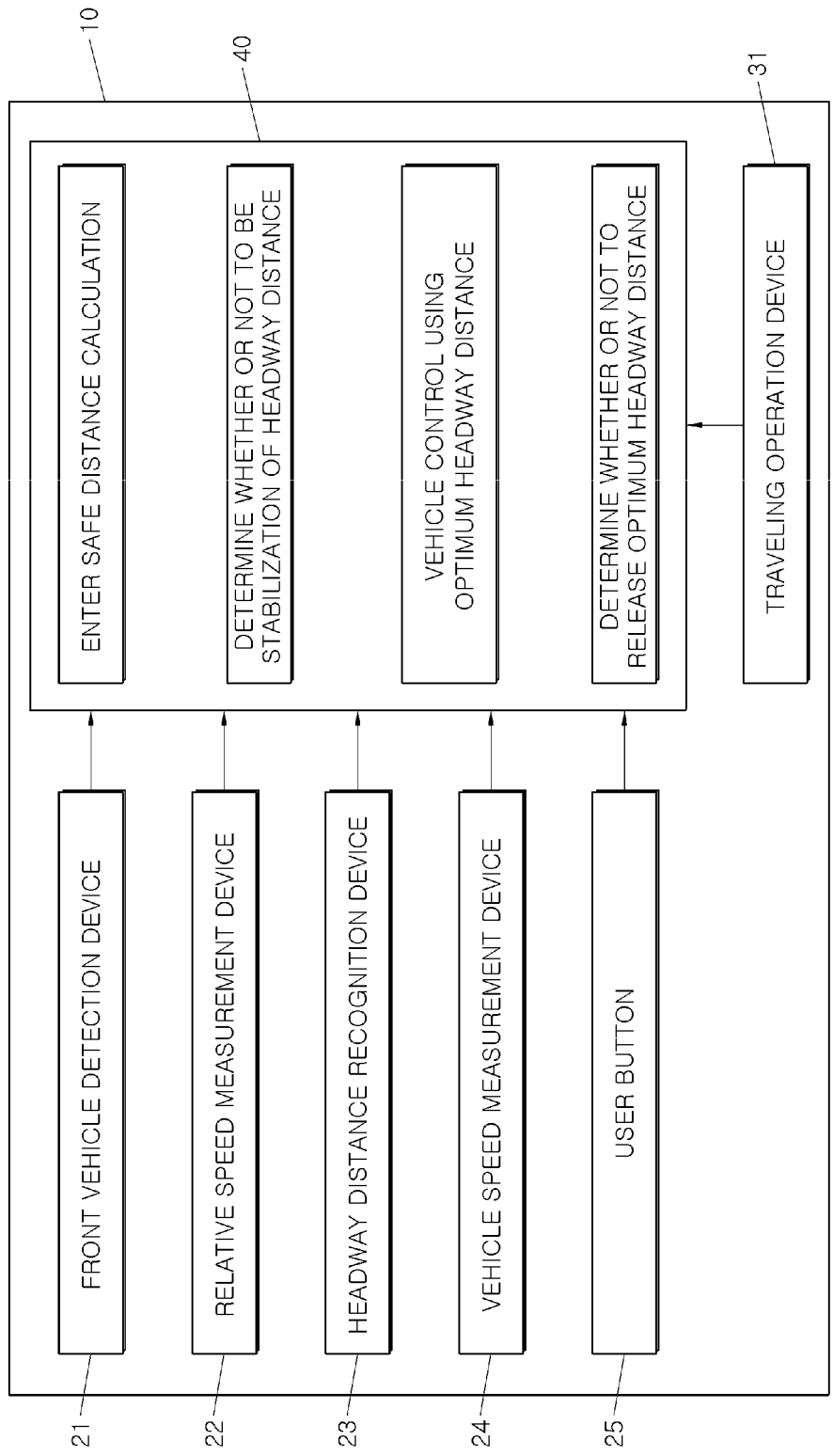

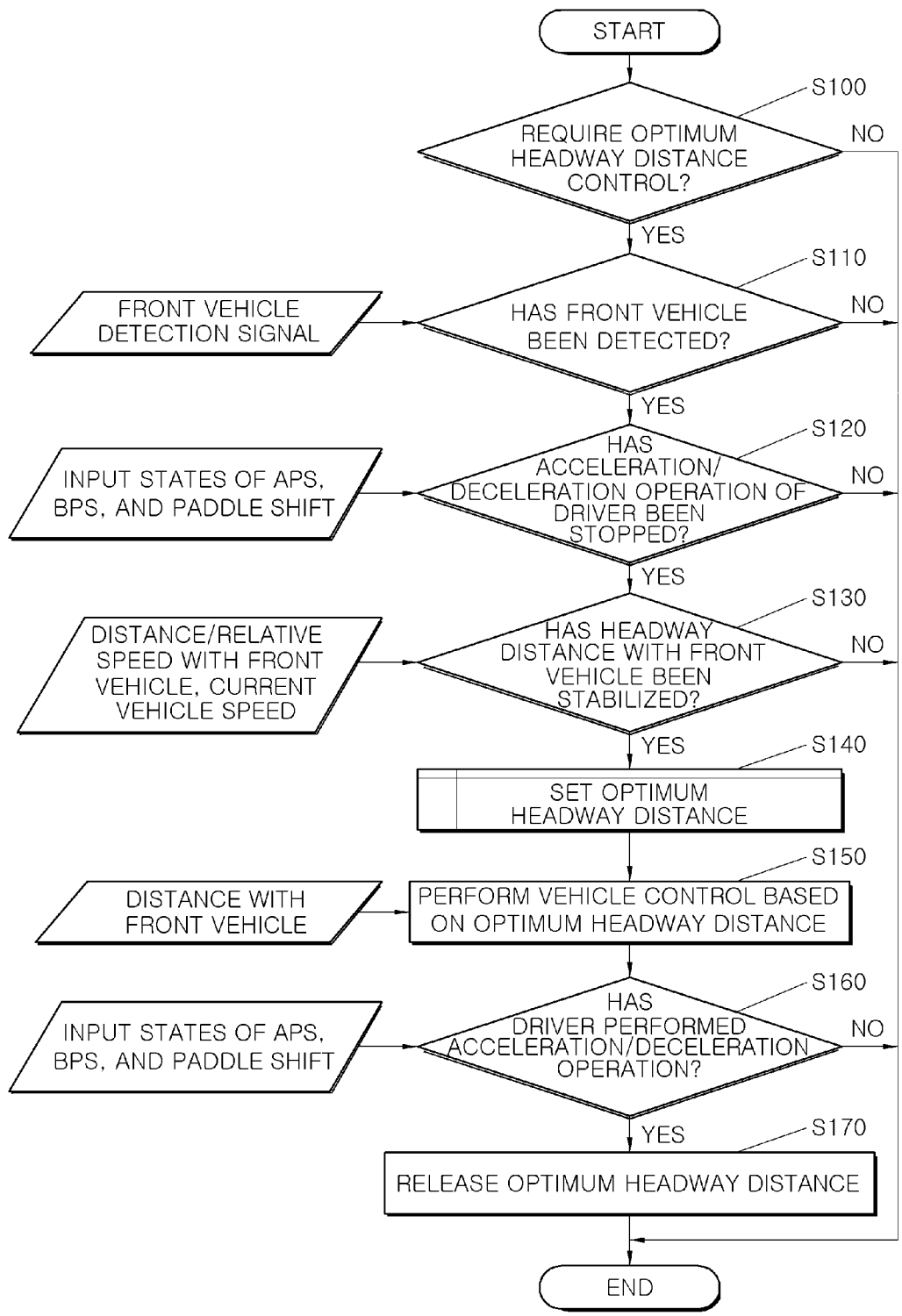

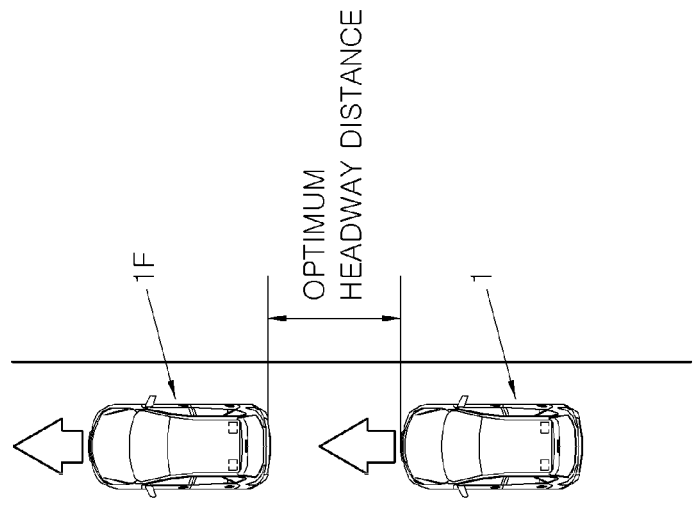
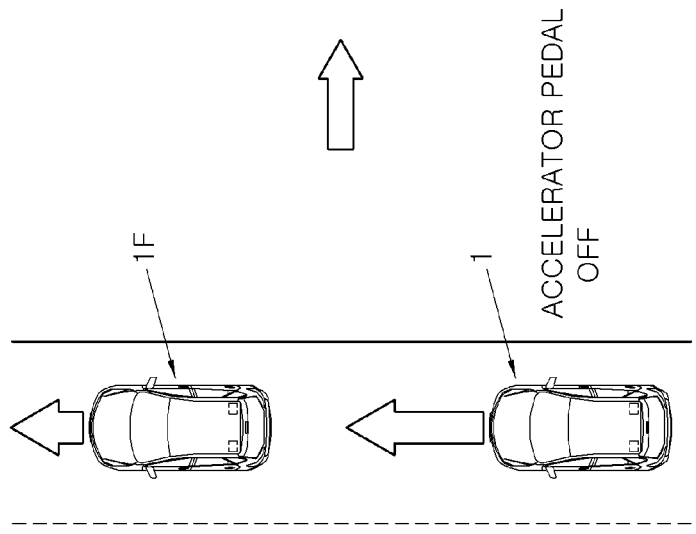
FIG.3A

OPTIMUM HEADWAY DISTANCE SETTING SYSTEM AND OPTIMUM HEADWAY DISTANCE SETTING METHOD USING THE SAME

CROSS-REFERENCE TO RELATED APPLICATION

The present application claims priority to Korean Patent Application No. 10-2018-0093343, filed on Aug. 9, 2018, the entire contents of which is incorporated herein for all purposes by this reference.

BACKGROUND OF THE DISCLOSURE

Field of the Disclosure

The present invention relates to a headway distance setting system and method for maintaining a predetermined headway distance with a front vehicle located in front of a vehicle, and more particularly, to an optimum headway distance setting system for setting an optimum headway distance with a front vehicle by confirming the traveling propensity based on the acceleration operation or the deceleration operation of a driver and controlling the traveling of a vehicle with the optimum headway distance which is optimized for the traveling propensity of the driver, and an optimum headway distance setting method using the same.

Description of Related Art

In recent years, a system for controlling acceleration or deceleration of a vehicle using a sensor mounted in a vehicle has been increasingly applied for a driver's traveling convenience.

For example, a cruise control system for the vehicle travels at a speed set by the driver without operating an accelerator pedal during traveling.

Particularly, in recent years, a Smart Cruise Control (SCC) system is increasingly spread that constantly maintains a distance with a vehicle which is traveling in front of the vehicle (hereinafter, referred to as a 'front vehicle') while traveling at a speed which is set by the driver, reduces a vehicle speed when the speed of the front vehicle reduces to thereby reduce the distance with the front vehicle, and accelerates to the set speed when the distance with the front vehicle increases.

In a current smart cruise control system, the driver not only sets the vehicle speed, but also sets the distance with the front vehicle. When the smart cruise control system operates, the vehicle travels according to a target speed which is set by the driver while maintaining a predetermined distance with the front vehicle. In the present time, the distance with the front vehicle basically maintains the headway distance by a predetermined value or maintains the headway distance selected by the driver among various headway distances.

An emergency braking system, etc. in addition to the smart cruise control system controls the vehicle using the distance between the vehicle and the front vehicle. When an object or a vehicle is present in front of the vehicle during traveling, the emergency braking system warns it to the driver, and then operates a braking device. In the emergency braking system, the distance at which the emergency braking system operates (the distance with the front object or vehicle) is fixed according to the vehicle speed.

As described above, in the system for achieving the driver's operation convenience using the distance and relative speed with the object located in front of the vehicle, particularly, the vehicle which is traveling in front of the vehicle, the headway distance which is the operation condition of the system is fixed and controlled as a predetermined value.

Since the headway distance was controlled by the fixed predetermined value, the vehicle could not be controlled to reflect the traveling propensity of the driver, and to change the headway distance, the driver had to individually operate a headway distance setting button.

Furthermore, the traveling propensity of the driver is also changed according to traveling circumstances, for example, whether or not to travel on the road for the use of a vehicle (urban traveling/highway traveling), traffic situations (congestion/smooth traffic), etc., but the vehicle could not be controlled to reflect it.

For example, the smart cruise control system does not consider the driver's propensity, such that a sufficient safety distance cannot be ensured when the vehicle is controlled, thus causing an accident.

Furthermore, even in the emergency braking system, there has been a problem in that the headway distance with the front vehicle is controlled by only a fixed value, such that a sufficient safety distance cannot be secured or the traveling propensity of the driver cannot be reflected.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an optimum headway distance setting system and an optimum headway distance setting method using the same, which determines the traveling propensity of the driver with the speed adjustment operation of the driver to set an optimum headway distance reflecting the traveling propensity of the driver, and then controls the traveling of the vehicle with the optimum headway distance.

In an optimum headway distance setting system for maintaining a distance between a vehicle and a front vehicle which is traveling in front of the vehicle in accordance with various aspects of the present invention for achieving the object, a control unit of controlling the traveling of the vehicle detects the front vehicle, and when a relative speed between the vehicle and the front vehicle is within a predetermined speed without performing the speed adjustment operation from a driver, sets the headway distance at that time between the vehicle and the front vehicle as an optimum headway distance according to a traveling propensity of the driver.

The control unit controls the traveling of the vehicle to maintain the optimum headway distance.

The optimum headway distance setting system may include a relative speed measurement device configured for detecting the relative speed between the vehicle and the front vehicle, and a traveling operation device configured for operating a vehicle speed by the driver; and when it is detected from the relative speed measurement device that the relative speed between the vehicle and the front vehicle is within the predetermined speed without an operation of the traveling operation device, the control unit is configured to set the headway distance at that time as the optimum headway distance.

The optimum headway distance is reset as a new value every time in which the relative speed between the vehicle and the front vehicle is within the predetermined speed without the speed adjustment operation from the driver.

When a cruise control is operated, the control unit detects the front vehicle, and then when the relative speed between the vehicle and the front vehicle is within the predetermined speed without an acceleration operation from the driver, sets the headway distance at that time between the vehicle and the front vehicle as an optimum headway distance, and controls so that the cruise control is operated while the vehicle follows the front vehicle to maintain the optimum headway distance.

The control unit controls the traveling so that the vehicle follows the front vehicle while maintaining the optimum headway distance when the front vehicle travels at a speed lower than a speed which is set by the cruise control.

When regenerative braking is operated upon deceleration of the vehicle, the control unit detects the front vehicle, and then when the relative speed between the vehicle and the front vehicle is within the predetermined speed without a deceleration operation from the driver, sets the headway distance at that time between the vehicle and the front vehicle as the optimum headway distance, and controls so that the regenerative braking is operated while the vehicle follows the front vehicle to maintain the optimum headway distance.

The control unit is configured to release the optimum headway distance when the speed adjustment operation is performed by the driver again while controlling the traveling of the vehicle with the optimum headway distance.

The control unit is configured to set the optimum headway distance between the vehicle and the front vehicle according to the speed adjustment operation of the driver when the driver requires to set the optimum headway distance to control the traveling of the vehicle.

The optimum headway distance setting system may further include a front vehicle detection device mounted in the vehicle and configured for detecting the front vehicle; a headway distance recognition device configured for detecting the distance between the vehicle and the front vehicle; and a vehicle speed measurement device configured for measuring a vehicle speed of the vehicle.

The predetermined speed may range from −1 km/h to 1 km/h.

Meanwhile, an optimum headway distance setting method in accordance with various aspects of the present invention may include determining whether or not to stop the speed adjustment operation for a vehicle from a driver of the vehicle while a front vehicle which is traveling in front of the vehicle is detected by a control unit; determining whether or not to be stabilization of a headway distance between the vehicle and the front vehicle when the speed adjustment operation for the vehicle is stopped by the control unit; and setting the headway distance configured to set the stabilized headway distance as an optimum headway distance according to a traveling propensity of the driver by the control unit and stores the optimum headway distance in the control unit.

When the vehicle is traveling, the determining whether or not to stop the speed adjustment operation and the determining whether or not to be stabilization of a headway distance are repeatedly performed, and the optimum headway distance is reset as a new value every time in which the headway distance between the vehicle and the front vehicle becomes stabilized without the operation of a traveling operation device.

The optimum headway distance setting method may further include, after the setting the optimum headway distance, maintaining the optimum headway distance that control the traveling of the vehicle to maintain the optimum headway distance with the front vehicle by the control unit.

The determining whether or not to be stabilization of a headway distance is to determine that the headway distance has been stabilized when a state in which the relative speed between the vehicle and the front vehicle is within the predetermined speed is maintained for a certain time or by a certain distance.

The optimum headway distance setting method may further include, after the maintaining of the optimum headway distance has been performed, determining whether or not to perform the speed adjustment operation for the vehicle by the driver of the vehicle by the control unit; and releasing the optimum headway distance when it is determined that the speed adjustment operation from the driver has been performed.

The detecting of the front vehicle to the releasing the optimum headway distance are repeatedly performed while the vehicle is traveling.

Before the detecting of the front vehicle, determining whether or not to start the operation that determines whether or not it has been required from the driver to control the traveling of the vehicle by setting the optimum headway distance.

The determining whether or not to start the operation determines that a cruise control has been activated, the detecting of the front vehicle detects the front vehicle, the determining whether or not to stop the speed adjustment operation determines that the acceleration operation has been stopped by the driver, and then in the determining whether or not to be stabilization of the headway distance, when the vehicle is traveling for a certain time or by a certain distance in a state in which the relative speed between the vehicle and the front vehicle is within the predetermined speed, the setting the optimum headway distance sets the headway distance between the vehicle and the front vehicle as the optimum headway distance, and the maintaining of the optimum headway distance controls so that the cruise control is operated while the vehicle follows the front vehicle while maintaining the optimum headway distance.

The determining whether or not to start the operation determines that the regenerative braking has been activated, the detecting of the front vehicle detects the front vehicle, the determining whether or not to stop the speed adjustment operation determines that the deceleration operation is stopped by the driver, and then in the determining whether or not to be stabilization of the headway distance, when the vehicle is traveling for a certain time or by a certain distance in a state in which the relative speed between the vehicle and the front vehicle is within the predetermined speed, the setting the optimum headway distance sets the headway distance between the vehicle and the front vehicle as the optimum headway distance, and the maintaining of the optimum headway distance controls so that the regenerative braking is operated while the vehicle follows the front vehicle while maintaining the optimum headway distance.

The predetermined speed may range from −1 km/h to 1 km/h.

According to the optimum headway distance setting system and the optimum headway distance setting method using the same of the present invention having the configuration, it is possible to maintain the optimum headway distance between the vehicle and the front vehicle.

In the present time, it is possible to variously set the headway distance according to a traveling propensity of the driver.

Furthermore, it is possible to maintain the optimum headway distance according to a change in the traveling circumstances (whether or not to travel on the road for the use of the vehicle, whether or not to travel on the urban, etc.) and traffic situations (congestion/smooth traffic, etc.).

Furthermore, it is normally possible to apply it through an operation during traveling (an accelerator pedal operation or a brake pedal operation) even without additional operation or setting of a passenger, thus increasing traveling operation convenience of the driver.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a block diagram illustrating an optimum headway distance setting system in accordance with various aspects of the present invention.

FIG. 2 is a flowchart illustrating an optimum headway distance setting method using the optimum headway distance setting system in accordance with various aspects of the present invention.

FIG. 3A is a schematic diagram illustrating the state that sets an optimum headway distance during acceleration traveling according to the optimum headway distance setting system and the optimum headway distance setting method using the same in accordance with various aspects of the present invention.

Figure 3B:
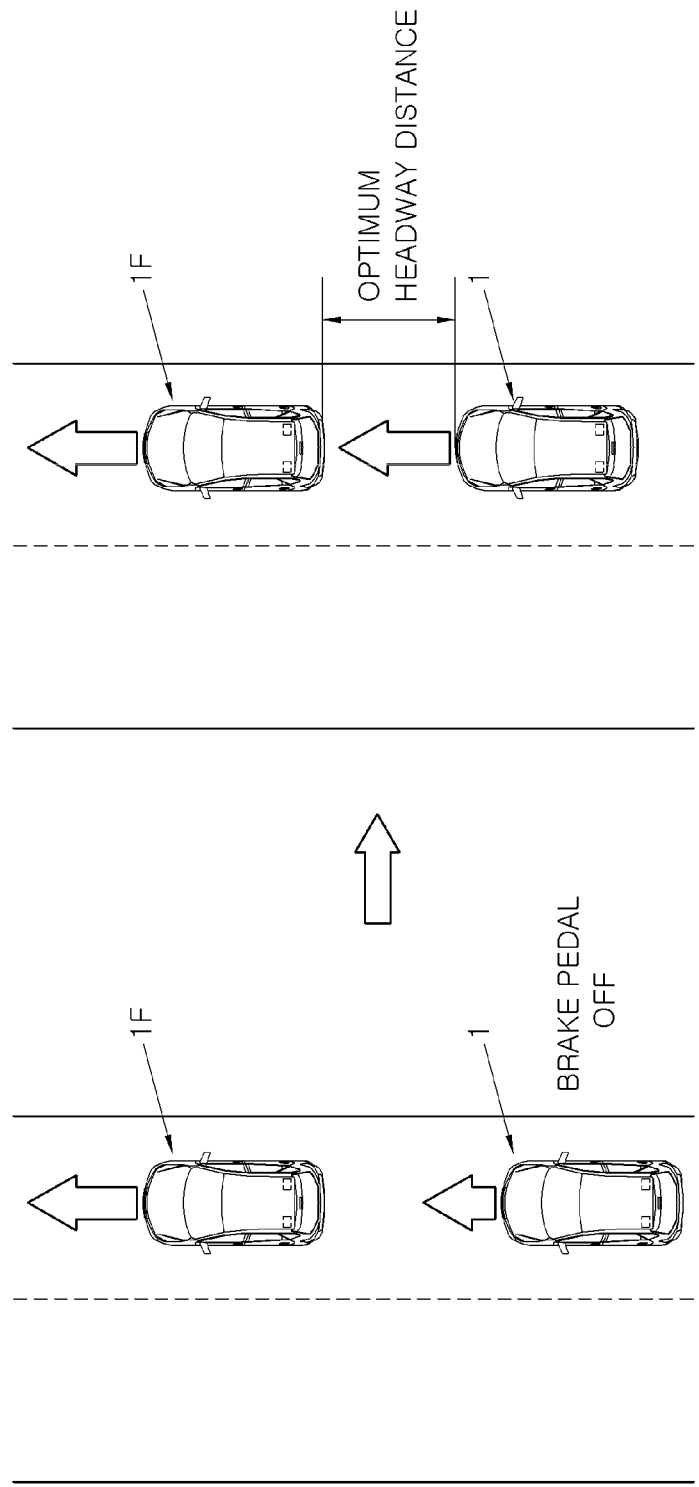
FIG. 3B is a schematic diagram illustrating the state that sets an optimum headway distance during deceleration traveling according to the optimum headway distance setting system and the optimum headway distance setting method using the same in accordance with various aspects of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an optimum headway distance setting system and an optimum headway distance setting method using the same in accordance with various aspects of the present invention will be described in detail with reference to the accompanying drawings.

An optimum headway distance setting system 10 in accordance with various aspects of the present invention may be applied to a vehicle mounted with a system for detecting a distance between a vehicle 1 operated by a driver and a front vehicle 1F traveling in front of the vehicle, thus providing operation convenience. For example, the optimum headway distance setting system may be applied to a vehicle applying a smart cruise control system in which decelerates when approaching the front vehicle while traveling at a speed set by the driver, and accelerates to the set speed when moving away from the front vehicle 1F. Alternatively, the optimum headway distance setting system may be applied to a vehicle applying an emergency braking system which is configured so that a braking device is operated after warning when an object is present in front of the vehicle during traveling of the vehicle, or to a vehicle applying a smart regenerative system that changes regenerative braking according to traveling situations (distances with gradient and the front vehicle, a relative vehicle speed, etc.) upon deceleration traveling or coasting traveling.

Also, the optimum headway distance setting system 10 in accordance with various aspects of the present invention may be applied for controlling the headway distance with the front vehicle even in a system to which the systems (the smart cruise control system, the emergency braking system, the smart regenerative system, etc.) are not applied, and operates independently of the systems.

Furthermore, the optimum headway distance setting system 10 in accordance with various aspects of the present invention can maintain the optimum headway distance with the front vehicle, and the present invention may be applied to a system applying only a deceleration function without an acceleration function (e.g., the emergency braking system, the smart regenerative system, etc.) when the distance with the front vehicle is close.

The optimum headway distance setting system 10 in accordance with various aspects of the present invention includes a relative speed measurement device 22 for detecting a relative speed between the vehicle 1 and the front vehicle 1F, a headway distance recognition device 23 for detecting the distance between the vehicle 1 and the front vehicle 1F, a vehicle speed measurement device 24 for measuring a current speed of the vehicle 1, and a control unit 40 for controlling the optimum headway distance setting system 10 and the traveling of the vehicle 1 by receiving signals output from the devices and a signal output from a traveling operation device 31 for accelerating or decelerating the vehicle.

The front vehicle detection device 21 detects whether or not the front vehicle 1F is traveling in front of the vehicle 1 using a camera, a radar, a laser scanner, etc.

The relative speed measurement device 22 measures the relative speed between the vehicle 1 and the front vehicle 1F using the radar or the laser scanner.

The headway distance recognition device 23 detects the headway distance between the vehicle 1 and the front vehicle 1F using the radar or the laser scanner. The headway distance becomes a distance from the rear end portion of the front vehicle 1F to the front end portion of the vehicle 1.

The vehicle speed measurement device 24 may be a wheel speed sensor of the vehicle. Alternatively, it may be also determined by use of the speeds of a motor and an engine that are driving sources of the vehicle and the state of a transmission, or may be also determined from the information input from a navigation installed in the vehicle.

When the driver stops the speed adjustment operation of the vehicle 1 and the relative speed with the front vehicle 1F becomes within a predetermined speed, the control unit 40 sets the headway distance at that time as an optimum headway distance according to a traveling propensity of the driver. The predetermined speed may range from −1 km/h to 1 km/h. The predetermined speed becomes substantially zero. The control unit 40 controls the traveling of the vehicle 1 so that the headway distance between the vehicle 1 and the front vehicle 1F becomes the optimum headway distance until before the driver performs the speed adjustment operation again. Herein, the speed adjustment operation means that the driver operates an accelerator pedal for accelerating the vehicle, operates a brake pedal for decelerating the vehicle, or operates a paddle shift for adjusting the regenerative braking amount (the case which is set to adjust the regenerative braking amount instead of the shift through the peddle shift).

When the relative speed between the vehicle 1 and the front vehicle 1F becomes within the predetermined speed without the speed adjustment operation of the driver and then a certain time or a certain distance elapses, the control unit 40 determines that the headway distance between the vehicle 1 and the front vehicle 1F has been stabilized to thereby set the headway distance at that time as an optimum headway distance. The control unit 40 controls the traveling of the vehicle 1 using the thus set optimum headway distance.

Meanwhile, when the driver performs the speed adjustment operation again, the control unit 40 releases the optimum headway distance, and then when a condition for setting a new headway distance is established again, sets a new optimum headway distance. The optimum headway distance set at that time may be set as a new value which is different from the previously set optimum headway distance.

The headway distance required by the driver varies according to his or her propensity and road situations. When the relative speed between the vehicle 1 and the front vehicle 1F is within the predetermined speed without the speed adjustment operation and the vehicle travels for a certain time or by a certain distance, the control unit 40 controls the traveling of the vehicle by setting the headway distance at that time as an optimum headway distance which is a headway distance required by the driver.

Since an optimum headway distance setting method, which will be described later, is stored as logic in the control unit 40, the control unit 40 controls the optimum headway distance setting system 10 while performing the optimum headway distance setting method.

The control unit 40 can set the optimum headway distance by the determination of the control unit 40, but when the driver desires to control the traveling of the vehicle 1 by applying the optimum headway distance, the control unit 40 can also allow the driver to set the optimum headway distance.

For example, when the control unit 40 detects that the driver turns on a smart cruise control switch for using the smart cruise control function, or turns on the smart cruise control switch for using the smart regenerative braking system, the control unit 40 can enter the traveling control of the vehicle using the optimum headway distance. Herein, turning on the switch includes not only operating a physical switch mounted in a vehicle interior, but also activating the corresponding function through an Audio, Video, Navigation (AVN), a cluster, etc. Furthermore, when there is a means for activating a function to maintain the optimum headway distance with the front vehicle 1F independently of the smart cruise control and the smart regenerative braking system, its operation is also included therein.

The control unit 40 may be an Electronic Control Unit (ECU) for the vehicle.

Meanwhile, the optimum headway distance setting system 10 may include a user button 25. When the vehicle 1 is spaced from the front vehicle 1F by the headway distance required by the driver, it may be set as an optimum headway distance. Furthermore, the user button 25 may be applied as a toggle switch and may be also set to release the optimum headway distance. Furthermore, a plurality of the user buttons 25 may be also provided therein.

Meanwhile, when the smart cruise control system, the emergency braking system, the smart regenerative system, etc. Are operated, the optimum headway distance setting system 10 in accordance with various aspects of the present invention operates by interlocking with the systems. The smart cruise control system controls the acceleration and deceleration of the vehicle 1 to control so that the vehicle 1 travels at the set speed while maintaining the headway distance with the front vehicle 1F, and the emergency braking system and the smart regenerative system maintain the headway with the front vehicle 1F only with the deceleration function.

Furthermore, only the optimum headway distance setting system 10 in accordance with various aspects of the present invention may be also applied to a vehicle to which the smart cruise control system, the emergency braking system, the smart regenerative system, etc. Are not applied.

FIG. 2 illustrates an optimum headway distance setting method using the optimum headway distance setting system in accordance with various aspects of the present invention.

The optimum headway distance setting method in accordance with various aspects of the present invention is performed by use of the optimum headway distance setting system described above.

The optimum headway distance setting method in accordance with various aspects of the present invention includes detecting the front vehicle that determines whether or not there is the front vehicle 1F which is traveling in front of the vehicle 1 during traveling by the control unit 40 S110; determining whether or not to stop the speed adjustment operation for the vehicle 1 by a driver of the vehicle 1 by the control unit 40 when the front vehicle 1F is detected S120; determining whether or not to be stabilization of a headway distance between the vehicle 1 and the front vehicle 1F by the control unit 40 when the speed adjustment operation for the vehicle 1 is stopped S130; setting the stabilized headway distance between the vehicle 1 and the front vehicle 1F as an optimum headway distance by the control unit 40, and storing the optimum headway distance in the control unit 40 when the headway distance is stabilized S140; and maintaining the optimum headway distance that is configured to control the traveling of the vehicle to maintain the optimum headway distance with the front vehicle 1F by the control unit 40 S150.

Determining whether or not to start the operation S100 determines whether or not the control unit 40 is set to control the traveling of the vehicle using the optimum headway distance. For example, when the control unit 40 detects that the driver turns on the smart cruise control switch for using the smart cruise control function or turns on the smart cruise control switch for using the smart regenerative braking system, it may be determined to control the traveling of the vehicle using the optimum headway distance. Herein, the turning on the switch includes not only operating a physical switch mounted in a vehicle interior, but also activating the corresponding function through an Audio, Video, Navigation (AVN), a cluster, etc. Furthermore, when there is a means for activating the function to maintain the optimum headway distance with the front vehicle 1F independently from the smart cruise control system and the smart regenerative braking system, its operation may be included therein.

However, since the control unit 40 can determine that the control unit 40 controls the traveling of the vehicle 1 with the optimum headway distance using various information input to the control unit 40, the determining whether or not to start the operation S100 may be also omitted.

The detecting of the front vehicle S110 detects whether or not there is the front vehicle 1F which is traveling in front of the vehicle 1. The detecting of the front vehicle S110 determines whether or not there is the front vehicle 1F which is traveling in front of the vehicle 1 using the front vehicle detection device 21, etc. mounted in the vehicle 1.

The determining whether or not to stop the speed adjustment operation S120 is performed when the front vehicle 1F is detected, and determines whether or not the driver has operated the traveling operation device 31 of the vehicle, for example, a means for adjusting the speed of the vehicle such as the accelerator pedal, the brake pedal, or the paddle shift, and then has stopped the operation. The determining whether or not to stop the speed adjustment operation S120 determines whether or not any one operation of the accelerator pedal, the brake pedal, or the paddle shift which is being operated has been stopped by the control unit 40.

For example, when a signal is output from an Acceleration Position Sensor (APS) mounted in the vehicle and then stopped, it may be determined that the driver has operated the accelerator pedal and then has stopped the acceleration operation. Furthermore, when a signal is output from a Brake Pedal Sensor (BPS) mounted in the vehicle 1 and then stopped, it may be determined that the driver has operated the brake pedal and then has stopped the deceleration operation. Alternatively, when a signal is input from the paddle shift and then stopped, it may be also determined that the acceleration/deceleration operation, that is, the speed adjustment operation has been stopped. The smart regenerative braking system sets whether or not to operate the smart regenerative braking, the basic regenerative braking, etc. using the paddle shift, and accordingly, the deceleration degree of the vehicle is determined, such that the operation of the paddle shift may be also regarded as one of the speed adjustment operation.

Herein, the reason why the control unit 40 determines whether or not the speed adjustment operation of the driver has been stopped is as follows. The driver stops the speed adjustment operation when the vehicle is spaced from the front vehicle 1F at the headway distance according to a traveling propensity of the driver. Accordingly, it is possible to determine whether or not the driver has stopped the speed adjustment operation, thus confirming the traveling propensity of the driver, that is, the degree of maintaining the headway distance with the front vehicle.

For example, the driver who travels by keeping close to the front vehicle 1F will stop the acceleration operation or the deceleration operation when it is closer to the front vehicle 1F than in a normal case. Furthermore, the driver who travels by keeping the headway distance with the front vehicle 1F far away will stop the acceleration operation or the deceleration operation at a distance farther than the example described above.

Furthermore, even upon the deceleration, the driver stops the deceleration operation when reaching the desired headway distance.

Accordingly, it is used to determine whether or not the acceleration operation or the deceleration operation of the driver has been stopped to confirm the traveling propensity of the driver.

Accordingly, the determining whether or not to be stabilization of a headway distance S130 determines whether or not the headway distance between the vehicle 1 and the front vehicle 1F is stabilized after the speed adjustment operation for the vehicle 1 has been stopped.

That is, the determining whether or not to be stabilization of a headway distance S130 determines whether or not the relative speed between the vehicle 1 and the front vehicle 1F converges to within the predetermined speed. The relative speed converging to within the predetermined speed means that the relative speed between the vehicle 1 and the front vehicle 1F is less than a predetermined relative speed and the relative speed reduces continuously. The predetermined speed may range from −1 km/h to 1 km/h. The predetermined speed becomes substantially zero.

Furthermore, in the determining whether or not to be stabilization of a headway distance S130, the control unit 40 determines that the headway distance has been stabilized when the state where the relative speed converged to within the predetermined speed is maintained for a certain time or by a certain distance. The traveling for a certain time or by a certain distance while the relative speed is within the predetermined speed means that the driver can regard the headway distance in the state where the relative speed is within the predetermined speed as the headway distance optimized for the traveling propensity of the driver.

When the determining whether or not to be stabilization of a headway distance S130 determines that the headway distance between the vehicle 1 and the front vehicle 1F has been stabilized, the setting the optimum headway distance S140 sets the headway distance at that time as the optimum headway distance. The headway distance in the state performed until the determining whether or not to be stabilization of a headway distance S130 becomes the headway distance considering the traveling propensity of the driver, that is, the optimum headway distance for the driver. The optimum headway distance is stored in the control unit 40.

the maintaining of the optimum headway distance S150 controls the vehicle speed using the optimum headway distance so that the control unit 40 maintains the optimum headway distance with the front vehicle 1F. The control unit 40 controls the traveling of the vehicle 1 to be spaced from the front vehicle 1F, and then decelerates the vehicle 1 when approaching the front vehicle 1F within the optimum headway distance, and accelerates the vehicle 1 to become the optimum headway distance with the front vehicle 1F when being separated at the optimum headway distance or more again.

FIG. 3A illustrates an example of controlling the traveling with the optimum headway distance during acceleration. When the vehicle 1 approaches the front vehicle 1F during acceleration traveling, the driver stops the operation of the accelerator pedal. When the operation of the accelerator pedal is substantially stopped, the output of the signal from the APS is completely OFF or the output of the signal becomes insignificant, and the control unit 40 determines that the acceleration operation of the driver has been stopped. Thereafter, the vehicle 1 is gradually decelerated. As such, when the headway distance between the vehicle 1 and the front vehicle 1F is stabilized (traveling for a certain time or by a certain distance while the relative speed is within the predetermined speed), the control unit 40 sets the headway distance at that time as the optimum headway distance. The control unit 40 controls the traveling of the vehicle 1 with the thus set optimum headway distance.

FIG. 3B illustrates an example of controlling the traveling with the optimum headway distance during deceleration. When the operation of the brake pedal is substantially stopped (when the BPS is OFF or the output value of the BPS is insignificant) while the front vehicle 1F has been detected, the vehicle 1 is accelerated to approach the front vehicle 1F. Thereafter, when the headway distance between the vehicle 1 and the front vehicle 1F is stabilized, the control unit 40 controls the traveling of the vehicle 1 by setting the headway distance at that time as the optimum headway distance like upon acceleration.

After the maintaining of the optimum headway distance S150 is performed, determining whether or not to perform the speed adjustment operation S160 may be performed. The determining the speed adjustment operation S160 determines whether or not the driver of the vehicle 1 performs the speed adjustment operation such as the acceleration operation or the deceleration operation for the vehicle 1 by the control unit 40. That is, when the operation of the traveling operation device 31 such as the accelerator pedal, the brake pedal, or the paddle shift is detected, it may be determined that the speed adjustment operation has been performed.

As described above, when the operation of the traveling operation device 31 is detected, the control unit 40 does not use the optimum headway distance any more. When the road situations such as road congestion or road gradient are changed, the driver performs the speed adjustment operation through the traveling operation device 31 to further approach or move away from the front vehicle 1F. As described above, when the operation of the traveling operation device 31 by the driver is detected, releasing the optimum headway distance set in the setting the optimum headway distance S140 to control the vehicle S170 is performed.

The releasing the optimum headway distance S170 can control the traveling of the vehicle by only the driver's operation, or can control the traveling of the vehicle 1 using a pre-fixed headway distance according to the speed of the vehicle 1.

Meanwhile, when the vehicle is traveling after the releasing the optimum headway distance S170 has been performed, the detecting of the front vehicle S110 to the releasing the optimum headway distance S170 are repeatedly performed.

Furthermore, when the corresponding condition is not satisfied in the detecting of the front vehicle S110, the determining whether or not to stop the speed adjustment operation S120, the determining whether or not to be stabilization of a headway distance S130, or the determining whether or not to perform the speed adjustment operation S160, it is determined whether or not the vehicle 1 is traveling; when the vehicle 1 is traveling, the optimum vehicle distance is newly reset while it is repeatedly perform from the detecting of the front vehicle S110; and the traveling of the vehicle is controlled by the newly set optimum headway distance.

Hereinafter, as a specific embodiment, an example in which the vehicle to which the cruise control, particularly, the smart cruise control is applied controls the optimum headway distance during acceleration will be described.

While the vehicle 1 is traveling, the driver activates the smart cruise control S110, the driver accelerates the vehicle 1 to a desired speed, or the driver temporarily accelerates the vehicle when the vehicle 1 is traveling at a speed set by the driver.

After the front vehicle 1F which is traveling in front of the vehicle 1 is detected S110, in the state detecting that the driver has stopped the acceleration operation S120, it is determined whether or not the state where the relative speed of the front vehicle 1F is within the predetermined speed has been maintained for a certain time or by a certain distance S130. When the state where the relative speed is within the predetermined speed has been maintained, the headway distance at that time is set as the optimum headway distance, and the traveling is controlled so that the vehicle 1 follows the front vehicle 1F while maintaining the optimum headway distance S150. Meanwhile, when traveling at a speed lower than a predetermined speed set by the cruise control, the traveling is controlled so that the vehicle 1 follows the front vehicle 1F while maintaining the optimum headway distance.

Thereafter, when there is a new speed adjustment operation from the driver S160, the set optimum headway distance is released to control the traveling of the vehicle 1 S170.

Meanwhile, when the relative speed between the vehicle 1 and the front vehicle 1F becomes within the predetermined speed again while the vehicle 1 is traveling, the headway distance at that time is reset as the optimum headway distance to control the traveling of the vehicle 1.

In another exemplary embodiment of the present invention, an example in which a vehicle to which the smart regenerative braking system is applied controls the optimum headway distance during deceleration will be described.

When it is detected that the front vehicle 1F is traveling ahead during traveling (particularly, coasting traveling) S110 and the vehicle is traveling without the operation of the paddle shift for adjusting the regenerative braking amount S120, the vehicle decelerate while performing regenerative braking.

Meanwhile, in the state which is set so that the smart regenerative braking is activated through the AVN or the cluster for use in the vehicle to which the smart regenerative braking system is applied S100, it may be performed as described above, and a general regenerative braking system which is not the smart regenerative braking system can perform the procedures S110 and S120 without separate activation.

After the front vehicle 1F is detected ahead, in the state detecting that the driver has stopped the operation of the brake pedal so that the headway distance between the vehicle 1 and the front vehicle 1F becomes the distance desired by the driver S120, it is determined whether or not the state where the relative speed between the vehicle 1 and the front vehicle 1F is within the predetermined speed has been maintained for a certain time or by a certain distance S130. When the state where the relative speed is within the predetermined speed has been maintained, the headway distance at that time is set as the optimum headway distance, and the vehicle 1 is controlled so that the vehicle 1 follows the front vehicle 1F and performs regenerative braking thereof while maintaining the optimum headway distance S150.

Likewise, while the vehicle 1 is traveling in the state where the smart regenerative braking or the normal regenerative braking is applied, when the relative speed between the vehicle 1 and the front vehicle 1F becomes within the predetermined speed again, the headway distance at that time is reset as the optimum headway distance to control the traveling of the vehicle 1.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An optimum headway distance setting system for maintaining a distance between a vehicle and a front vehicle which is traveling in front of the vehicle, the optimum headway distance setting system comprising:
 a controller of controlling a traveling of the vehicle and configured to detect the front vehicle, and in a response that a relative speed between the vehicle and the front vehicle is within a predetermined speed without a speed adjustment operation from a driver, in order to set an optimum headway distance by the speed adjustment operation, to set a headway distance between the vehicle and the front vehicle as the optimum headway distance according to a traveling propensity of the driver, wherein the controller is configured to release the optimum headway distance in a response that the speed adjustment operation is performed by the driver again while controlling the traveling of the vehicle with the optimum headway distance, and wherein the optimum headway distance is reset as a new value every time in which the relative speed between the vehicle and the front vehicle is within the predetermined speed without the speed adjustment operation from the driver.

2. The optimum headway distance setting system of claim 1,
 wherein the controller is configured to control the traveling of the vehicle to maintain the optimum headway distance.

3. The optimum headway distance setting system of claim 2, including:
 a relative speed measurement device configured for detecting the relative speed between the vehicle and the front vehicle; and
 a traveling operation device configured for operating a vehicle speed by the driver,
 wherein in a response that it is detected from the relative speed measurement device that the relative speed between the vehicle and the front vehicle is within the predetermined speed without an operation of the traveling operation device, the controller is configured to set the headway distance as the optimum headway distance.

4. The optimum headway distance setting system of claim 2,
 wherein in a response that a cruise control is operated, the controller is configured to detect the front vehicle, and then in a response that the relative speed between the vehicle and the front vehicle is within the predetermined speed without an acceleration operation from the driver, to set the headway distance between the vehicle and the front vehicle as the optimum headway distance, and to control so that the cruise control is operated while the vehicle follows the front vehicle to maintain the optimum headway distance.

5. The optimum headway distance setting system of claim 4,
 wherein the controller is configured to control the traveling of the vehicle so that the vehicle follows the front vehicle while maintaining the optimum headway distance in a response that the front vehicle is traveling at a speed lower than a predetermined speed set by the cruise control.

6. The optimum headway distance setting system of claim 2,
 wherein in a response that regenerative braking is operated upon deceleration of the vehicle, the controller is configured to detect the front vehicle, and then in a response that the relative speed between the vehicle and the front vehicle is within the predetermined speed without a deceleration operation from the driver, to set the headway distance between the vehicle and the front vehicle as the optimum headway distance, and to control so that the regenerative braking is operated while the vehicle follows the front vehicle to maintain the optimum headway distance.

7. The optimum headway distance setting system of claim 1, wherein the controller is configured to set the optimum headway distance between the vehicle and the front vehicle according to the speed adjustment operation of the driver in a response that the driver requests to control the traveling of the vehicle by setting the optimum headway distance.

8. The optimum headway distance setting system of claim 1, further including:
 a front vehicle detection device mounted in the vehicle and configured for detecting the front vehicle;
 a headway distance recognition device configured for detecting the distance between the vehicle and the front vehicle; and
 a vehicle speed measurement device configured for measuring a vehicle speed of the vehicle.

9. The optimum headway distance setting system of claim 1,
 wherein the predetermined speed is from −1 km/h to 1 km/h.

10. An optimum headway distance setting method, including:
 determining, by a controller, when to stop a speed adjustment operation for a vehicle by a driver of the vehicle while a front vehicle which is traveling in front of the vehicle is detected by the controller, in order to set an optimum headway distance by the speed adjustment operation;
 determining, by the controller, when to be stabilization of stabilize a headway distance between the vehicle and the front vehicle in a response that the speed adjustment operation for the vehicle is stopped by the controller; and setting by the controller, the optimum headway distance configured to set the stabilized headway distance as the optimum headway distance, according to a traveling propensity of the driver by the controller, and to store the optimum headway distance in the controller, after the setting of the optimum headway distance, maintaining, by the controller, the optimum headway distance configured to control the traveling of the vehicle to maintain the optimum headway distance with the front vehicle, and after the maintaining of the optimum headway distance has been performed, determining, by the controller, when to perform the speed adjustment operation for the vehicle by the driver of the vehicle; and releasing, by the controller, the optimum headway distance in a response that the controller concludes that the speed adjustment operation from the driver has been performed.

11. The optimum headway distance setting method of claim 10,
wherein in a response that the vehicle is traveling, the determining of when to stop the speed adjustment operation and the determining of when to stabilize the headway distance are repeatedly performed, and
wherein the optimum headway distance is reset as a new value every time in which the headway distance between the vehicle and the front vehicle is stabilized without an operation of a traveling operation device.

12. The optimum headway distance setting method of claim 10,
wherein the determining of when to stabilize the headway distance is configured to determine that the headway distance has been stabilized in a response that a state in which a relative speed between the vehicle and the front vehicle is within a predetermined speed is maintained for a predetermined time or with a predetermined distance.

13. The optimum headway distance setting method of claim 10,
wherein the detecting of the front vehicle to the releasing the optimum headway distance are repeatedly performed while the vehicle is traveling.

14. The optimum headway distance setting method of claim 10,
wherein before the detecting of the front vehicle, determining when to start an operation of determining when the driver has requested control of the traveling of the vehicle by setting the optimum headway distance.

15. The optimum headway distance setting method of claim 14,
wherein the determining of when to start the operation is configured to determine that a cruise control has been activated,
wherein the detecting of the front vehicle is configured to detect the front vehicle,
wherein the determining of when to stop the speed adjustment operation is configured to determine that an acceleration operation has been stopped, and then in a response that the vehicle is traveling for a predetermined time or with a predetermined distance in a state in which a relative speed between the vehicle and the front vehicle is within a predetermined speed in the determining of when to be stabilization of the headway distance, the setting of the optimum headway distance is configured to set the headway distance between the vehicle and the front vehicle as the optimum headway distance, and
wherein the maintaining of the optimum headway distance is configured to control so that the cruise control is operated while the vehicle follows the front vehicle while maintaining the optimum headway distance.

16. The optimum headway distance setting method of claim 14,
wherein the determining of when to start the operation is configured to determine that a regenerative braking has been activated,
wherein the detecting of the front vehicle is configured to detect the front vehicle,
wherein the determining of when to stop the speed adjustment operation is configured to determine that a deceleration operation has been stopped by the driver, and then in a response that the vehicle is traveling for a predetermined time or with a predetermined distance in a state in which a relative speed between the vehicle and the front vehicle is within a predetermined speed in the determining of when to be stabilization of the headway distance, the setting of the optimum headway distance is configured to set the headway distance between the vehicle and the front vehicle as the optimum headway distance, and
wherein the maintaining of the optimum headway distance is configured to control so that the regenerative braking is operated while the vehicle follows the front vehicle while maintaining the optimum headway distance.

* * * * *